United States Patent [19]

Fritsch

[11] Patent Number: 4,916,564
[45] Date of Patent: * Apr. 10, 1990

[54] CLEANING APPARATUS FOR A DISC DRIVE

[75] Inventor: Joseph F. Fritsch, Dunmore East, Ireland

[73] Assignee: Ryan Plastics Ireland Limited, Waterford, Ireland

[*] Notice: The portion of the term of this patent subsequent to Nov. 11, 2003 has been disclaimed.

[21] Appl. No.: 174,213

[22] Filed: Mar. 28, 1988

Related U.S. Application Data

[60] Continuation of Ser. No. 884,048, Jul. 10, 1986, abandoned, which is a division of Ser. No. 671,742, Nov. 15, 1984, Pat. No. 4,622,617.

[51] Int. Cl.[4] .................... G11B 5/91; G11B 23/02
[52] U.S. Cl. ..................................... 360/128; 360/133; 360/137; 15/210 R
[58] Field of Search ................ 360/128, 133, 137; 15/210 R

[56] References Cited

U.S. PATENT DOCUMENTS

| | | | |
|---|---|---|---|
| 4,065,798 | 12/1977 | Sugisaki et al. | 360/128 |
| 4,104,436 | 8/1978 | Suzuki et al. | 15/210 R X |
| 4,106,067 | 8/1978 | Masuyama et al. | 360/137 |
| 4,375,658 | 3/1983 | Martinelli | 360/86 X |
| 4,377,831 | 3/1983 | Davis et al. | 360/128 |
| 4,408,241 | 10/1983 | Ogawa | 360/128 |
| 4,498,114 | 2/1985 | Davis | 360/128 |
| 4,503,473 | 3/1985 | Eyler et al. | 360/128 |
| 4,558,386 | 12/1985 | Kara | 360/128 |
| 4,622,617 | 11/1986 | Fritsch | 360/128 |

FOREIGN PATENT DOCUMENTS 1074444 3/1980 Canada .

OTHER PUBLICATIONS

IBM Technical Disclosure Bulletin, "Head Cleaning Cartridge", Feb. 1979, vol. 21, No. 9, pp. 3784-3785.

Primary Examiner—John H. Wolff
Attorney, Agent, or Firm—Hughes & Multer

[57] ABSTRACT

Apparatus for cleaning the read/write head of a drive unit for a jacketted flexible magnetic disc comprises a thin substantially square jacket, having, in register on each side, a central aperture and a slot which extends radially from adjacent the central aperture in a direction towards and normal to the rear edge of the jacket. The jacket contains a double-sided cleaning element having a pair of opposite cleaning surfaces of which a portion of each is exposed by a respective slot. The cleaning surfaces comprise respective layers of cleaning material secured together via an intermediate layer of a material which is impermeable to magnetic head cleaning fluid.

6 Claims, 3 Drawing Sheets

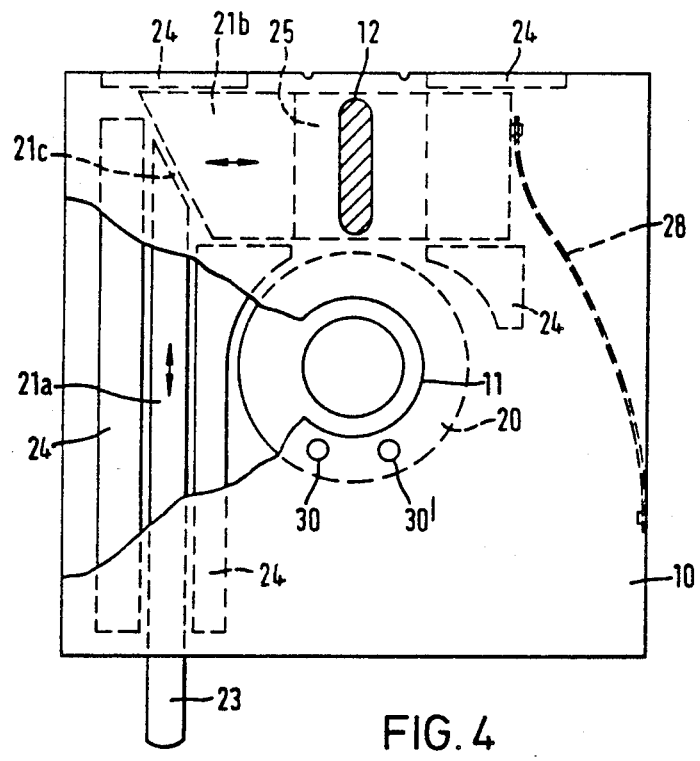

CLEANING APPARATUS FOR A DISC DRIVE

This is a continuation of application Ser. No. 884,048, filed July 10, 1986, now abandoned which is a divisional application of U.S.S.N. 671,742, filed Nov. 15, 1984 now U.S. Pat. No. 4,622,617.

This invention relates to an apparatus for cleaning the read/write head of a drive unit for a jacketted flexible magnetic disc.

One form of cleaning apparatus is known which consists of a conventional jacket of the kind used for flexible magnetic discs but which contains instead a cleaning disc made from spun-bonded polyester. In use the cleaning disc is wetted with a cleaning fluid and inserted in the drive unit aperture, and then the disc drive is run so that the cleaning disc cleans the read/write heads.

A disadvantage of this known form of cleaning apparatus is that if cross-contamination, i.e. cleaning solution containing residue removed from one magnetic head passes through the disc to the opposite surface there to contaminate the opposite magnetic head. Even when the disc drive unit has only a single magnetic head the opposite surface of the cleaning disc will become contaminated so that when the disc is turned over to use that opposite surface for cleaning the head the latter will become re-contaminated.

Accordingly, the present invention provides apparatus for cleaning the read/write head of a drive unit for a jacketted flexible magnetic disc comprising a thin substantially square jacket having in register on each side a central aperture and a slot which extends radially from adjacent the central aperture in a direction towards and normal to the rear edge of the jacket, the jacket containing a double-sided cleaning element of which a portion of each opposite cleaning surface is exposed by a respective slot, the cleaning surfaces comprising respective layers of cleaning material secured together via an intermediate layer of a material which is impermeable to magnetic head cleaning fluid.

In a dual-side drive unit this permits simultaneous cleaning of both heads without cross-contamination, while in a single-sided drive unit the disc may be turned over in the jacket to provide a fresh uncontaminated cleaning surface when desired.

The cleaning element may be a cleaning disc which is driven by the drive unit for cleaning the magnetic head(s). The intermediate layer may be MYLAR with the respective layers of cleaning material bonded to opposite sides of the MYLAR layer. Alternatively, the intermediate layer may be a bonding agent which directly bonds the layers of cleaning material together, providing such bonding agent when set is impermeable to cleaning fluid.

A further disadvantage of the known form of cleaning apparatus is that spun-bonded polyester is not very absorbant and therefore cannot retain very much of the cleaning fluid. Furthermore, this material does not have a very long fibre length and hence the cleaning disc tends to have some fibres with a free end which project out from the disc surface. Finally, the spun-bonded polyester disc has a rough surface and causes excessive friction as the disc surface moves over the read/write head. Accordingly, it is preferred that each layer of cleaning material comprises rayon satin.

The advantage of using rayon satin as the cleaning material is that rayon is one of the most absorbant of man-made fibres which is important for retaining the cleaning fluid. Rayon also has a long fibre length which results in few if any loose ended fibres on the surface of the disc. The satin in the material provides smoothness to reduce the friction between the material and the magnetic head.

A further disadvantage of the known cleaning apparatus referred to above is that the same area of the cleaning disc is used each time, so that after it has been used a few times dirt particles collect on the disc which may then be deposited back on the head during subsequent use.

Thus, the cleaning element according to the invention may comprise a cleaning disc divided into independently rotatable concentric inner and outer portions, the opposite surfaces of the annular outer portion comprising the said respective layers of the cleaning material partially exposed by the slots.

Since the outer portions of the disc is not connected to the inner portion it is not rotated by the drive unit and can remain stationary during cleaning, the latter being effected by causing the head(s) to traverse back and forth along the slot(s). The particular area or segment of the outer portion of the cleaning disc which is exposed in each slot may be changed as often as desired by manual rotation of the outer portion to present a fresh cleaning surface to the magnetic head(s). Thus the undesirable build-up of dirt particles on any given segment of the disc is avoided.

Alternatively, the cleaning element according to the invention may include a member having a replaceable layer of cleaning material on opposite sides, each layer of cleaning material being partially exposed in a respective slot, the apparatus further including means to effect reciprocation of the member transverse the length of the slots.

The reciprocating means may include a manual actuator extending rearwardly from the front edge of the jacket and alongside the central aperture into engagement with the cleaning member, the actuator including a portion which projects from the front edge of the jacket to permit manual forward and rearward reciprocation of the actuator. In this case the actuator and the cleaning member have cooperating surfaces which slide relative to one another to convert the forward-to-rearward motion of the actuator into side-to-side motion of the cleaning member, the latter being moved in one direction of reciprocation by movement of the actuator and in the opposite direction by reciprocation by a spring acting in opposition to the actuator. Alternatively, the reciprocting means may include a central cam rotatable by the drive unit and which acts intermittently on the cleaning member to move the latter in one direction of reciprocation, the movement in the return direction being effected by the said spring acting in opposition to the cam.

It will be apparent that the ability to remove and replace the layer of cleaning material as desired also prevents a build up of dirt particles, and therefore this may be regarded as an alternative to the use of a cleaning disc separated into concentric inner and outer portions. In either case the cleaning material is preferably the aforesaid rayon satin, and the cleaning member to whose opposite sides the replaceable layers of the cleaning material are affixed is made of a material impermeable to cleaning fluid to prevent cross-contamination.

Embodiments of the invention will now be described, by way of example, with reference to the accompanying drawings, in which:

FIG. 4 is a plan view with the jacket partially removed of a third embodiment of a cleaning apparatus according to the invention.

Figure 1:
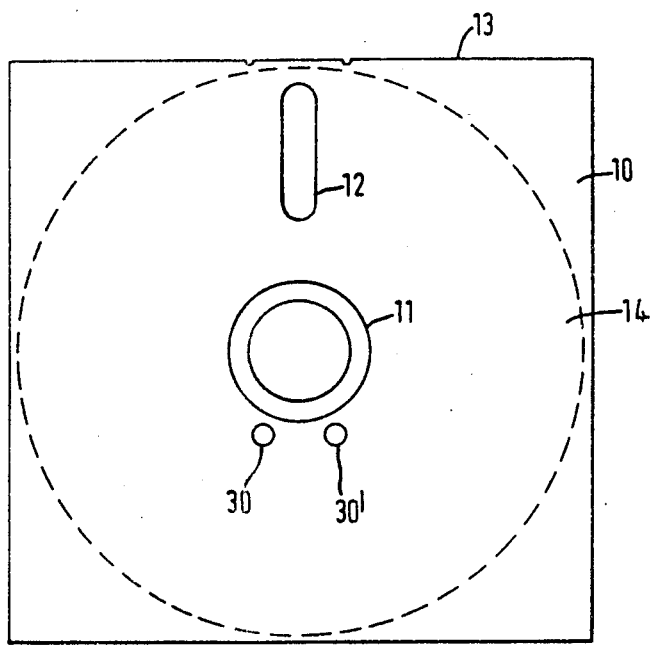
FIG. 1 is a plan view of a first embodiment of a cleaning apparatus according to the invention.

The cleaning apparatus shown in FIG. 1 comprises a thin substantially square outer jacket 10 which is of the kind conventionally used for flexible magnetic discs, and which therefore permits the cleaning apparatus to be inserted into a disc drive unit in substitution for a magnetic disc proper. Thus, in register on each side, the jacket has a circular central aperture 11 and a slot 12 which extends radially from adjacent the central aperture 11 in a direction towards and normal to the rear edge 13 of the jacket. The jacket also includes the usual small hole 30 which permits the drive unit to sense the presence of a disc in the unit, the hole 30 being duplicated at 30' to permit the jacket to be reversed in the drive unit.

Figure 2:
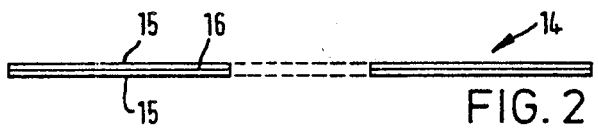
FIG. 2 is a cross-section of the cleaning disc of FIG. 1.

The jacket 10 contains a cleaning disc 14 having a diameter substantially the same as a conventional flexible magnetic disc, each opposite cleaning surface of the disc 14 comprising a layer 15 of rayon satin, FIG. 2. The two layers 15 are intimately secured together by an intermediate layer 16 of a bonding material which is impermeable to conventional magnetic head cleaning fluids.

In use of the apparatus of FIGS. 1 and 2, a cleaning fluid is first applied to the surfaces of the disc 14 through the slot 12 and then the jacket 10 is loaded into a disc drive unit in the usual manner. The drive unit is then run for perhaps 20 seconds to clean the head(s).

Figure 3:
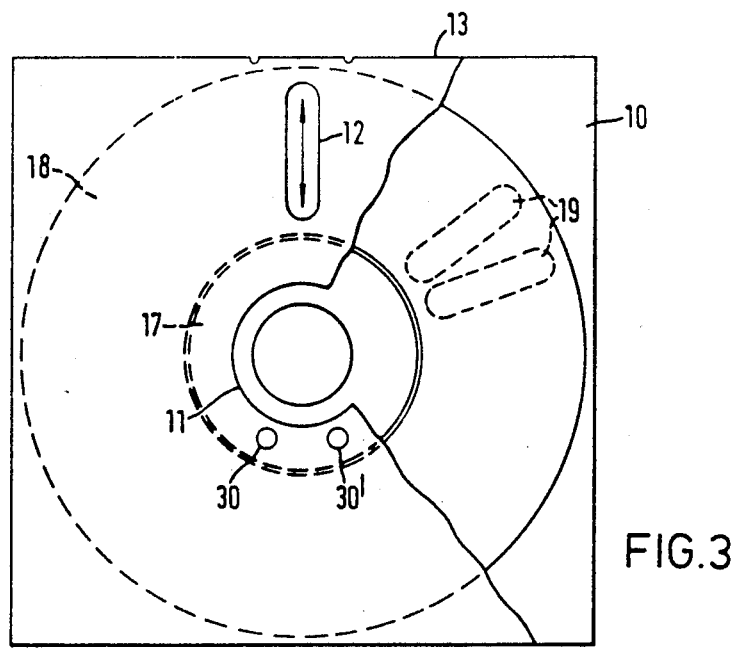
FIG. 3 is a plan view with the jacket partially removed of a second embodiment of a cleaning apparatus according to the the invention.

Referring now to FIG. 3, the cleaning apparatus illustrated has a jacket the same as the jacket 10 of FIG. 1 but here the cleaning disc is divided into two concentric inner and outer portions 17,18 respectively which are independently rotatable. Thus when the jacket 10 is inserted into a drive unit the outer portion 18 does not rotate. The outer portion 18 is constructed in similar manner to the cleaning disc 14 of FIG. 1, i.e. its opposite cleaning surfaces comprise rayon satin layers secured together by a bonding agent as aforesaid.

In the use the exposed surface of the outer portion 18 is wetted with cleaning fluid and the jacket 10 is inserted into a drive unit, the magnetic read/write head then being caused to traverse radially back and forth along the slot 12 in contact with the rayon satin surface of the outer portion 18, the latter being stationary. The traversing of the head may be effected by a hardware switch or a software command. When it is desired to provide a fresh cleaning surface in the slot 12 this is simply achieved by manually rotating the portion 18 within the jacket 10. The areas 19 represent used segments of the surface of the outer portion 18. As an alternative to layers of rayon satin covering each side of the outer portion 18, the latter could be ab annular plastics base which carries removeable self-adhesive segments of rayon satin slightly larger in size than the areas 19.

In FIG. 4 substantially the same jacket 10 is used as before, but the disc is reduced to a residual core 20 at the centre of the jacket 10. A flat actuator 21a extends rearwardly from the front edge 22 of the jacket 10, alongside the central aperture 11, to engage a flat cleaning member 21b which extends transversely across the slot 12. The front end 23 of the arm 21a extends through a slot (not shown) in the front edge 22 of the jacket and permits manual foreward and rearward reciprocation of the arm 21 as indicated by the arrows, the arm 21 being slidable between fixed flat guides 24. The actuator 21a and the cleaning member 21b have cooperating inclined surfaces 21c which slide relative to one another to convert the forward/rearward motion of the actuator 21a into side-to-side motion of the member 21b, the latter being removed to the right (as viewed) by movement of the actuator and to the left by a narrow leaf spring 28 acting in opposition to the actuator. The opposite cleaning surfaces of the arm 21 exposed in the slots 12 each comprises a replaceable self-adhesive layer 25 of the aforesaid rayon satin material. The cleaning member 21b is made of a material impermeable to cleaning fluid, such as MYLAR.

In use the layer 25 is wetted with cleaning fluid, the jacket 10 is inserted in the disc drive unit, the actuator 21a is manually reciprocated from outside the front edge 22 of the jacket 10 so that each rayon satin layer 25 reciprocates transversely of the respective slot 12 to clean the magnetic head(s).

Figure 5:
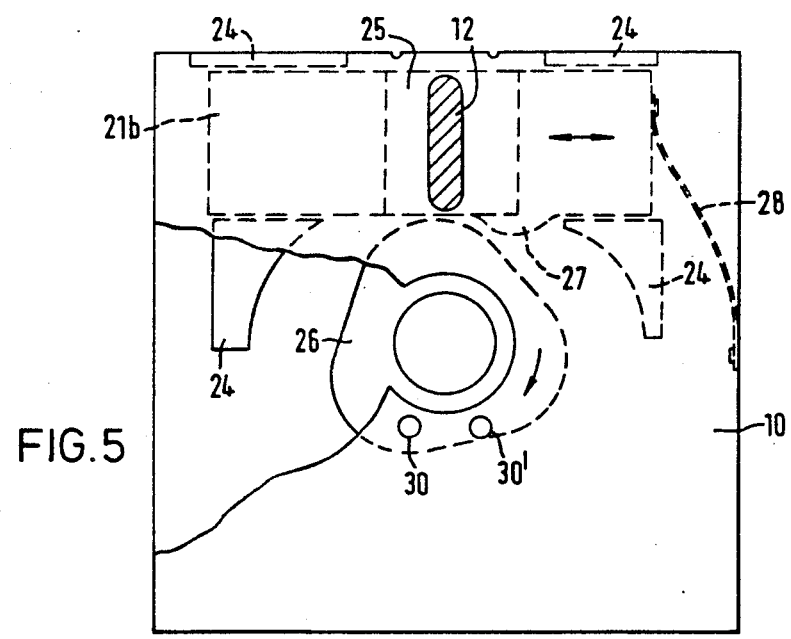
FIG. 5 is a plan view with the jacket partially removed of a modification of the third embodiment of the invention.

FIG. 5 shows a modification of FIG. 4 where reciprocation of the cleaning member 21b is performed automatically by the drive unit. In this case the residual core 20 takes the form of generally triangular cam 26 which, during rotation by the drive unit, acts intermittently on a projection 27 of the member 21b to move the latter to the right (as viewed in FIG. 5), the return movement being effected intermediate each cam actuation by the narrow leaf spring 28.

It is to be noted that in FIGS. 4 and 5 the guides 24, actuator 21a, member 21b and cam 26 should all be sufficiently thick for adequate strength and rigidity, and this may entail the jacket 10 being slightly thicker than a conventional jacket to provide room for these elements. However, most disc drive units will normally have adequate space in the insertion slot to accomodate a jacket 10 slightly thicker than usual.

The invention is not limited by or to the specific embodiments described which may be varied without departing from the scope of the invention.

I claim:

1. An apparatus for cleaning a read and/or write head of a drive unit for a jacketed flexible magnetic disc, comprising:
    a. a jacket adapted to be inserted in said drive unit and having at least one cleaning access opening at a cleaning location;
    b. an inner rotatable member positioned at a center location in said jacket so as to be engaged by a drive member of the drive unit to be rotated thereby;
    c. a cleaning member mounted in said jacket so as to be located at least partly at said cleaning location so as to be able to come into cleaning engagement with said read and/or write head, said cleaning member being movable independently of said inner rotatable member in a manner that different portions of said cleaning member can be moved to said cleaning location to perform a cleaning function.

2. The apparatus as recited in claim 1 wherein the inner rotatable member and the cleaning member comprise independently rotatable concentric inner and outer portions.

3. The apparatus as recited in claim 1 wherein said cleaning member is mounted so as to be moved back and forth and said apparatus further includes means to effect back and forth movement of said member.

4. The apparatus as recited in claim 3, wherein said means to effect back and forth movement includes a manual actuator extending rearwardly from a front edge of the jacket.

5. The apparatus as recited in claim 4, wherein said actuator and the cleaning member have cooperating surfaces which slide relative to one another to convert forward-to-rearward motion of the actuator into side-to-side motion of the cleaning member.

6. The apparatus as recited in claim 4, wherein the means to produce back and forth movement includes a central cam rotatable by the drive member of the drive movement and which acts intermittently on the cleaning member to move the cleaning member in one direction of reciprocation, and a spring acting in opposition to the cam for moving the cleaning member in the opposite direction of reciprocation.

* * * * *